United States Patent
Jurzitza

(10) Patent No.: US 8,955,574 B2
(45) Date of Patent: Feb. 17, 2015

(54) ULTRASONIC WELDING DEVICE WITH ROTARY COUPLER

(75) Inventor: Dieter Jurzitza, Karlsruhe (DE)

(73) Assignee: Herrmann Ultraschalltechnik GmbH & Co. KG, Karlsbad (DE)

( * ) Notice: Subject to any disclaimer, the term of this patent is extended or adjusted under 35 U.S.C. 154(b) by 0 days.

(21) Appl. No.: 14/119,598

(22) PCT Filed: May 29, 2012

(86) PCT No.: PCT/EP2012/060056
§ 371 (c)(1),
(2), (4) Date: Nov. 22, 2013

(87) PCT Pub. No.: WO2012/163919
PCT Pub. Date: Dec. 6, 2012

(65) Prior Publication Data
US 2014/0083623 A1    Mar. 27, 2014

(30) Foreign Application Priority Data
May 30, 2011   (DE) .......................... 10 2011 076 712

(51) Int. Cl.
| | | |
|---|---|---|
| B32B 37/00 | (2006.01) | |
| B23K 20/10 | (2006.01) | |
| B06B 3/00 | (2006.01) | |
| B06B 1/02 | (2006.01) | |
| B32B 37/06 | (2006.01) | |
| B29C 65/08 | (2006.01) | |

(52) U.S. Cl.
CPC . *B23K 20/10* (2013.01); *B06B 3/00* (2013.01); *B23K 20/106* (2013.01); *B06B 1/0238* (2013.01); *B32B 37/06* (2013.01); *B29C 65/086* (2013.01)

USPC .................................. 156/580.1; 310/323.18

(58) Field of Classification Search
USPC ......... 156/73.1, 580.1, 580.2; 228/110.1, 1.1; 264/442, 443, 444, 445; 425/174.2; 310/323.01, 323.18
See application file for complete search history.

(56) References Cited

U.S. PATENT DOCUMENTS

| 6,731,047 B2 * | 5/2004 | Kauf et al. .................... 310/317 |
| 2002/0056589 A1 | 5/2002 | Wucinich |

(Continued)

FOREIGN PATENT DOCUMENTS

| DE | 41 03 569 A1 | 8/1991 |
| DE | 103 43 325 A1 | 3/2005 |

(Continued)

*Primary Examiner* — James Sells
(74) *Attorney, Agent, or Firm* — Paul & Paul

(57) ABSTRACT

The present invention relates to an ultrasonic welding device with a generator for generating a high-frequency a.c. voltage, a converter for converting the a.c. voltage into a mechanical ultrasonic vibration and a sonotrode for transmitting the ultrasonic vibration to material to be worked, wherein the converter and the sonotrode are rotatable and a rotary coupler is arranged between the generator and the converter for the transmission of electrical energy from a static arrangement to a rotating arrangement, comprising a stationary element and an element that is rotatable in relation to the stationary element, wherein the stationary element comprises a primary circuit with two input terminals, which are connected to each other by means of a second coil with M turns, wherein the first and second coils are arranged in such a way that, when an a.c. voltage is applied to the input terminals, the magnetic field generated by the first coil induces an a.c. voltage in the second coil.

8 Claims, 5 Drawing Sheets

(56) References Cited

U.S. PATENT DOCUMENTS

2005/0034820 A1   2/2005   Schneider
2007/0125829 A1   6/2007   Stegelmann
2010/0090536 A1   4/2010   Krumme et al.
2010/0158307 A1   6/2010   Kubota

FOREIGN PATENT DOCUMENTS

| DE | 10 2008 042 700 A1 | 4/2010 |
| EP | 0 680 060 A1 | 11/1995 |
| EP | 1 157 752 A2 | 11/2001 |
| WO | 2008156116 A1 | 12/2008 |

* cited by examiner

ULTRASONIC WELDING DEVICE WITH ROTARY COUPLER

The present invention concerns an ultrasonic welding device having a generator for generating a high frequency ac voltage, a converter for converting the ac voltage into a mechanical ultrasonic vibration and a sonotrode for transmitting the ultrasonic vibration to a material to be worked. In that case the converter and the sonotrode are rotatable and a rotary coupler is arranged between the generator and the converter. The rotary coupler serves for the transmission of electric energy from a stationary arrangement to a rotating arrangement, with a stationary element and an element which is rotatable relative to the stationary element.

Particularly in the case of an ultrasonic welding device in which the sonotrode and the converter which is possibly fixedly connected by way of an amplitude transformer to the sonotrode rotate during the processing operation, the ac voltage signals generated by the generally stationarily arranged generator have to be transmitted to the rotating converter.

At the present time predominantly electromechanical systems are used for that purpose. In that case a mercury bath is frequently used, to make the contacts between the stationary element and the rotatable element irrespective of the set rotary angle.

That method suffers from the disadvantage that the high converter voltages which are necessary in particular for ultrasonic applications no longer lie in the specification range of conventional rotary couplers. In addition that technology can no longer be used in particular in relation to higher rotary speeds as then reliable contacting is no longer guaranteed.

In addition there are arrangements which operate with contact brushes or slip rings.

Taking the described state of the art as the basic starting point the object of the present invention is therefore that of providing an ultrasonic welding device having a rotary coupler, which is suitable in particular for ultrasonic applications, that is to say which reliably transmits signals at high frequencies and high rotary speeds and in which signal transmission is possible without a change in amplitude and/or phase.

According to the invention that object is attained in that the stationary element has a primary circuit with two input terminals which are connected together by way of a first coil with N turns and the rotatable element has a secondary circuit with two output terminals which are connected together by way of a second coil with M turns, wherein the first and second coils are so arranged that when an ac voltage is applied to the input terminals the magnetic field generated by the first coil induces an ac voltage in the second coil.

Coupling between the stationary and rotatable elements is therefore purely inductively effected.

In a preferred embodiment both the stationary element and also the rotatable element have a core portion, wherein the turns of the first coil are wound around a first winding axis on the core portion of the stationary element while the turns of the second coil are wound around a second winding axis on the core portion of the rotatable element.

The core portions preferably comprise a highly permeable material, best ferrite. That increases the magnetic coupling effect between the primary and the secondary circuits.

In a preferred embodiment the first and second winding axes include an angle $\alpha$ which is greater than 90°, preferably greater than 150°, particularly preferably greater than 170°, wherein the two winding axes best lie one upon the other.

That measure also further enhances the coupling effect between the primary and secondary circuits.

It has proven to be advantageous if the first or the second winding axis lies on the axis of rotation of the rotating element. It is best for even both winding axes to be on the axis of rotation of the rotating element to easily reduce the angular dependency of the coupler.

In a particularly preferred embodiment the stationary element and/or the rotatable element comprise a substantially rotationally symmetrical half-shell. The first and the second coil respectively is then arranged in the respective half-shell. It is best for the half-shell to have a core portion extending substantially perpendicularly from the shell bottom and around which the turns of the coil are wound.

It is best if both the stationary element and also the rotatable element comprise such a half-shell, which shells are so arranged that the core portions face towards each other.

Such an arrangement provides that the transmission of the electric signals is very substantially independent of the rotary angle. The core portions are preferably of a cylinder-symmetrical configuration and do not have any lateral incisions in order to minimise the rotary angle dependency in respect of the magnetic properties.

In a further preferred embodiment it is provided that the rotary coupler has a device for adjusting the spacing between the stationary element and the rotatable element. As the main inductance of the primary circuit depends on the spacing it can be adjusted by means of such a device. Particularly when using such a rotary coupler for ultrasonic applications therefore the spacing can be set to be so small that the main inductance is at least 5 times, preferably at least 10 times, greater than the internal inductance of the ultrasonic generator used. In that case feedbacks of the rotary coupler to the generator can be disregarded.

As a reduction in spacing increases the primary main inductance the feedback to the generator is reduced with the spacing of the stationary element from the rotatable element. The smaller the spacing between the two elements is however, the correspondingly greater are the demands made on the support mounting for the two elements, in particular at high rotary speeds.

With the described rotary coupler there is always a leakage inductance $L_S$ which cannot be disregarded by virtue of the separation of the primary winding from the secondary winding in two different chambers of the half-shell and because of the disk shape thereof. To minimise the influence of the rotary coupler on the signal to be transmitted a preferred embodiment provides that the primary circuit and/or the secondary circuit has a compensation capacitor connected in parallel or in series with the first or second coil. If a compensation capacitor is provided both in the primary circuit and also in the secondary circuit, the capacitances thereof are preferably selected to be the same. Particularly when the transmission ratio is not one however, non-identical capacitances may also be advantageous.

The compensation capacitance $C_K$ is calculated as $$C_K = \frac{1}{\omega^2 L_s}$$

with the angular frequency $\omega$ and the leakage inductance $L_S$, wherein $\omega = 2\pi f$ with the working frequency $f$.

In that respect $L_S$ denotes the leakage inductance and $f$ denotes the working frequency, that is to say in the case of using the rotary coupler in an ultrasonic application, the frequency of the generator. The use of a compensation capacitor is a possible way of compensating for the leakage inductance $L_S$. Other compensation circuits would also be conceivable.

Advantageously the ratio of N/M is between 0.75 and 15, preferably between 0.9 and 1.1, particularly preferably about 1 and best precisely 1.

In a preferred embodiment the main inductance of the rotary coupler is at least 5 times, preferably at least 10 times, greater than the inductance of the generator. That ensures that the main inductance does not have to be compensated. Detection of the amplitude current is then readily possible as it is not influenced by the rotary coupler.

The generator can then regulate the amplitude of the ultrasonic vibration based on a value proportional thereto in the electric system. That is a great advantage for the reliability of the overall arrangement.

In a preferred embodiment of the rotary coupler with great main inductance, it is substantially without any feedback to the generator. The rotary coupler according to the invention ensures that there is no difference in regard to operational reliability of the generator. The risk of damage to converter or sonotrode is minimised.

Furthermore a particularly preferred embodiment provides that the main inductance is so selected that it acts as the internal inductance of the generator for generating a high frequency ac voltage. In other words the generator does not have a parallel-connected coil. The task of the parallel-connected coil which is usually present is taken over by the main inductance of the rotary coupler. Basically a generator modified in that way can perform its function only in conjunction with the rotary coupler. As a result the generator can be produced at lower cost. It will be noted however that then the rotary coupler can no longer be used with all commercially available generators as the main inductance of the rotary coupler is too low for that purpose.

Further advantages, features and possible uses will be apparent from the description hereinafter of a preferred embodiment and the associated Figures in which.

Figure 1A:
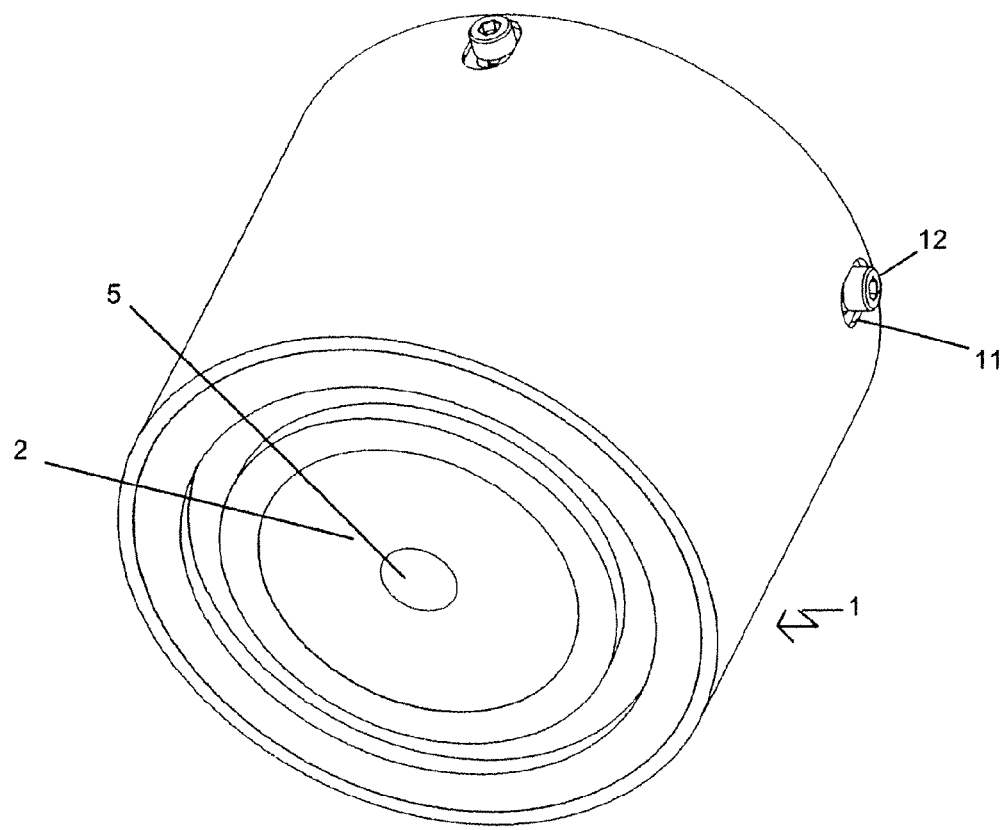
FIGS. 1a and 1b show perspective views of an embodiment of the rotary coupler.
Figure 1B:
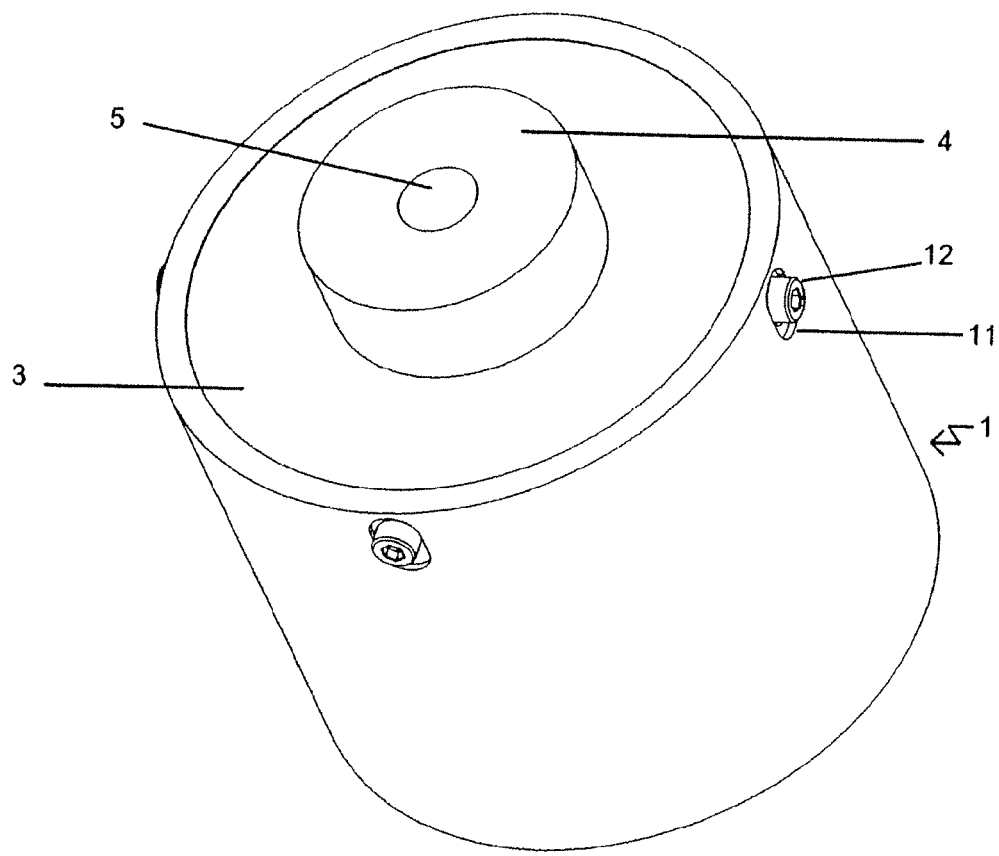

FIGS. 1a and 1b show perspective views of a rotary coupler 1 according to the invention. FIG. 1a shows a view on to the stationary part 2 while FIG. 1b shows a view on to the rotatable part 3. It is also possible to see a passage 5 extending through the rotary coupler, that is to say through the rotary part 3 and the stationary part 2, by way of which media like for example coolant can be supplied. The rotatable part 3 has a connecting projection 4.

Figure 2:
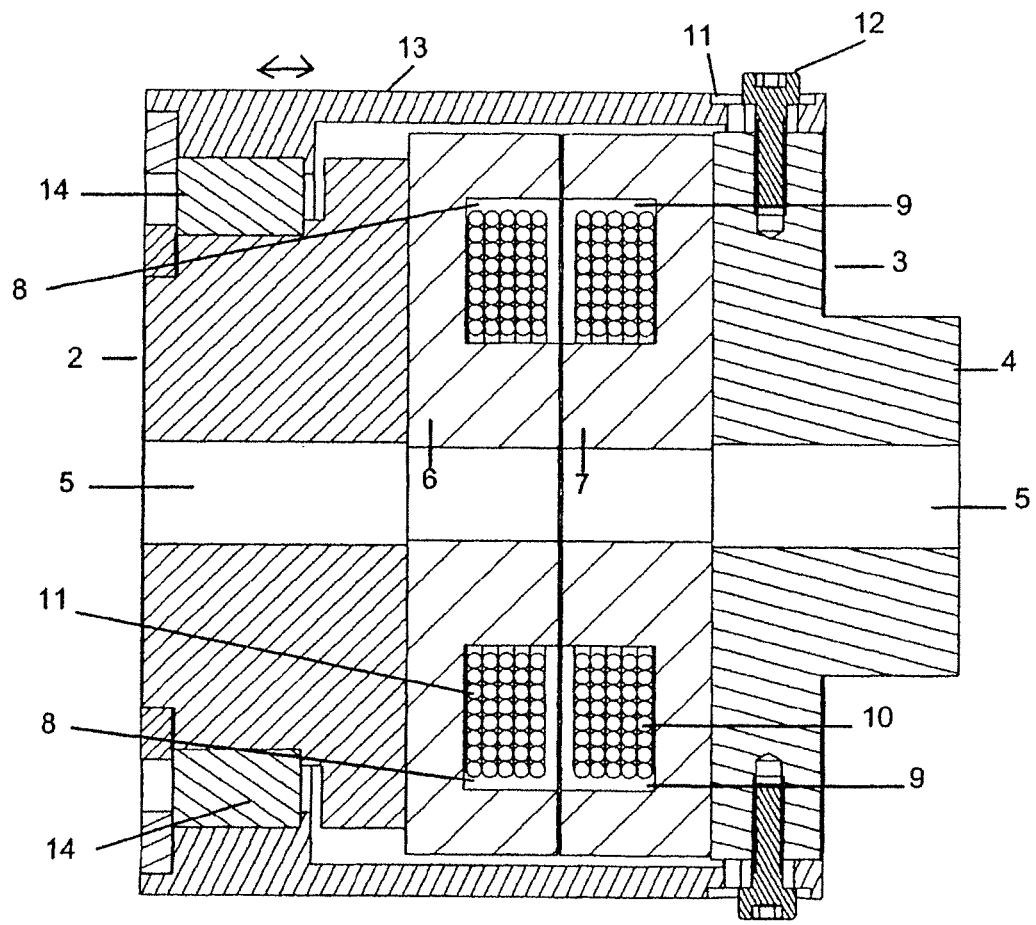
FIG. 2 shows a sectional view through the embodiment shown in FIGS. 1a and 1b.

As can best be seen in the sectional view in FIG. 2 the rotary coupler comprises a stationary part 2 and a rotatable part 3. The two parts are each in the form of a core half-shell 6, 7. The half-shells have a core portion which is in the shape of a hollow cylinder and does not have any lateral incisions.

Mounted on the core portion are a respective suitable number of turns 10, 11 of winding wire, wherein the winding resistance in each winding is as low as possible. The transformer core is made from a highly permeable material, preferably ferrite.

The two half-shells 6, 7 are rotationally symmetrical and each have a substantially annular winding space 8, 9.

A winding body, preferably of high temperature-resistant plastic material, is fitted into each of the winding spaces 8, 9 of the half-shells 6, 7. Each winding body is wound with a number of turns. In general the number of turns in both winding bodies is identical, but it is also possible to envisage situations of use in which the number of turns in the two winding bodies differ.

The two half-shells 6, 7 are so positioned relative to each other that the magnetic properties of the arrangement do not change when the rotatable element 3, 7 is rotated relative to the stationary element 2, 6. The number of turns should be at least so great that, with the signal amplitudes and frequencies to be expected, the core does not go into a saturation condition.

The spacing of the two half-shells relative to each other is so adjusted that a primary main inductance of the rotary coupler is set, which at least as far as possible is between 5 and 10 times greater than the internal inductance of the generator connected to the input terminals. By virtue of that measure the feedback effects of the rotary coupler to the generator can be disregarded.

To adjust the spacing of the two half-shells relative to each other there is provided an adjusting device. It comprises a slot 11 in the sleeve portion 13 and a screw 12 which engages through the slot 11 into a threaded bore in the rotatable part. The configuration in the form of the slot 11 makes it possible for the rotatable part 3 to which the core half-shell is fixed to be moved in the direction of the arrow relative to the sleeve portion 13 so that the spacing between the two half-shells 6, 7 can be adjusted. The sleeve element 13 rotates together with the rotatable part 3 relative to the stationary part 2. Suitable bearings 14 are therefore provided.

Figure 3:
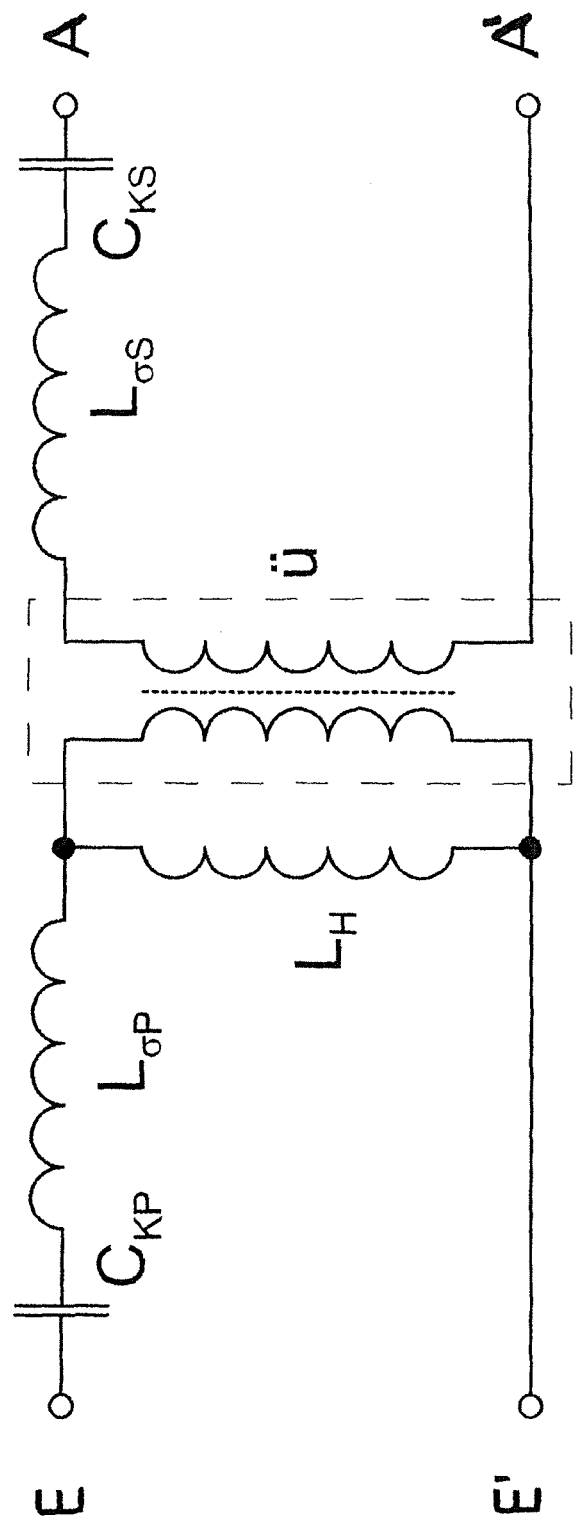
FIG. 3 shows a T-equivalent circuit diagram of the rotary coupler according to the invention.
Figure 4:
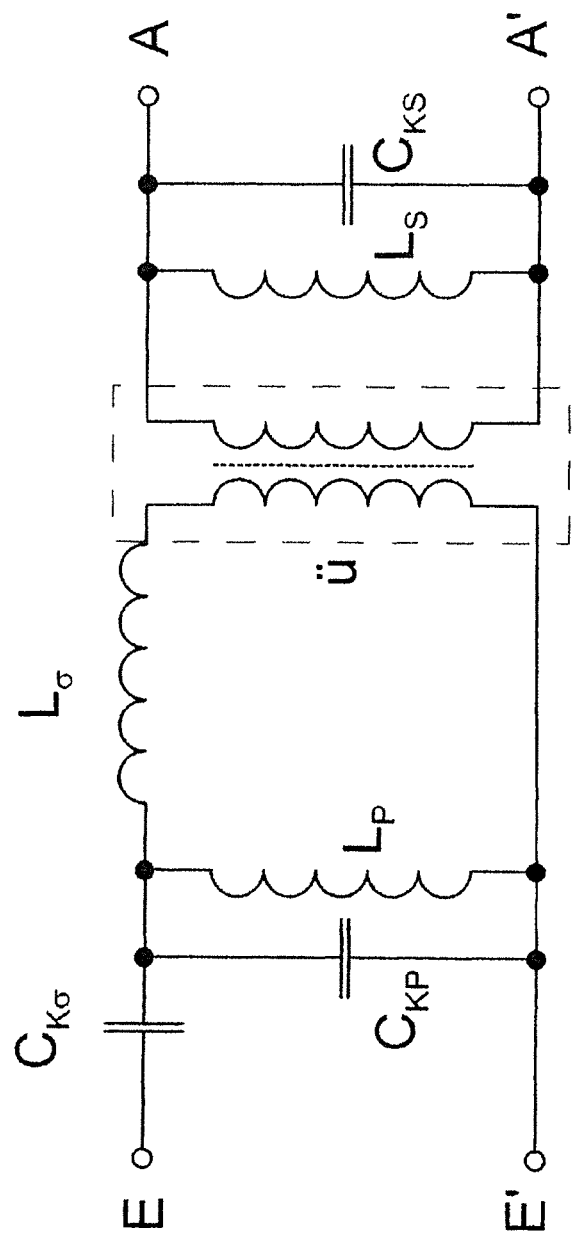
FIG. 4 shows a Pi-equivalent circuit diagram of the rotary coupler according to the invention.

FIGS. 3 and 4 show two equivalent circuit diagrams of the rotary coupler according to the invention, FIG. 3 showing a T-equivalent circuit diagram and FIG. 4 showing a Pi-equivalent circuit diagram.

The rotary coupler has two input terminals E, E' and two output terminals A, A'.

In FIG. 3 the rotary coupler is composed of the leakage inductances $L_{\alpha S}$ (secondary side), $L_{\alpha P}$ (primary side) and a main inductance $L_H$. Galvanic separation is effected by way of the ideal transmitter with the transmission ratio ü which in the preferred embodiment is equal to one.

By virtue of the structural technology involved the leakage inductance is between about 5% and 10% of the primary main inductance. The leakage inductance is almost independent of the size of the air gap between the stationary and rotatable elements. As the leakage inductances $L_{\alpha S}$ (secondary side), $L_{\alpha P}$ (primary side) worsen the energy transmission from generator to converter compensation in respect of the leakage inductance is required. That is effected by means of the compensation capacitors $C_{KP}$ (primary side) and $C_{KS}$ (secondary side) which are connected in series with the coils.

The foregoing description of the rotary coupler always relates to the T-equivalent circuit diagram as shown in FIG. 3.

For the sake of completeness however it is pointed out that the rotary coupler according to the invention can also be shown in the form of a Pi-equivalent circuit diagram. In that diagram the main inductance is divided into the two sub-inductances $L_P$ and $L_S$. Here there is only one leakage inductance $L_\alpha$. Leakage inductance compensation is then effected by means of the parallel capacitors $C_{KP}$ and $C_{KS}$ and with the series-connected capacitor $C_{K\alpha}$.

The impedance of the compensation network is so selected that at least at the operating frequency $F_0$, for example 30 kHz, it ensures that in magnitude it is the same as the impedance of the leakage inductance, but is of the opposite sign so that the impedance of the leakage inductance is compensated.

The invention claimed is:

1. An ultrasonic welding device having
a generator for generating a high frequency ac voltage,
a converter for converting the ac voltage into a mechanical ultrasonic vibration and
a sonotrode for transmitting the ultrasonic vibration to a material to be worked,
wherein the converter and the sonotrode are rotatable and a rotary coupler is arranged between the generator and the converter for the transmission of electric energy from a stationary arrangement to a rotating arrangement,
with a stationary element and an element which is rotatable relative to the stationary element,
wherein the stationary element has a primary circuit with two input terminals which are connected together by way of a first coil with N turns and the rotatable element has a secondary circuit with two output terminals which are connected together by way of a second coil with M turns,
wherein the first and second coils are so arranged that when an ac voltage is applied to the input terminals the magnetic field generated by the first coil induces an ac voltage in the second coil,
and wherein the primary circuit and/or the secondary circuit has a compensation capacitor connected in parallel or in series in relation to the first or second coil, wherein the compensation capacitor preferably has a capacitance $C_K$ which is calculated as $$C_K = \frac{1}{\omega^2 L_s},$$

with the circular frequency $\omega$ and the leakage inductance $L_s$.

2. An ultrasonic welding device as set forth in claim 1 characterised in that the stationary element and/or the rotatable element comprises a substantially rotationally symmetrical half-shell, wherein the first and/or the second coil are arranged in the respective half-shell, wherein preferably the half-shell has a core portion extending substantially perpendicularly from the shell bottom.

3. An ultrasonic welding device as set forth in one of claims 1 and 2 characterised in that there is provided a device for adjusting the spacing between the stationary element and the rotatable element.

4. An ultrasonic welding device as set forth in one of claims 1 through 2 characterised in that the ratio of N/M is between 0.75 and 1.5, preferably between 0.9 and 1.1, particularly preferably about 1 and best precisely 1.

5. An ultrasonic welding device as set forth in one of claims 1 through 2 characterised in that the main inductance of the rotary coupler is at least 5 times, preferably at least 10 times, greater than the inductance of the generator.

6. An ultrasonic welding device as set forth in one of claims 1 through 2 characterised in that the generator for generating a high frequency ac voltage does not have a parallel-connected coil and the main inductance of the rotary coupler serves as the inductance of the generator.

7. An ultrasonic welding device as set forth in one of claims 1 through 2 characterised in that both the stationary element and also the rotatable element have a core portion, wherein the turns of the first coil are wound around a first winding axis on the core portion of the stationary element while the turns of the second coil are wound around a second winding axis on the core portion of the rotatable element, wherein the first and second winding axes include an angle a which is greater than 90°, preferably greater than 150°, particularly preferably greater than 70°, and is best identical.

8. An ultrasonic welding device as set forth in claim 3, characterised in that the generator for generating a high frequency ac voltage does not have a parallel connected coil and the main inductance of the rotary coupler serves as the inductance of the generator.

* * * * *